United States Patent [19]

Yamanoi et al.

[11] Patent Number: 4,668,500
[45] Date of Patent: May 26, 1987

[54] METHOD OF PRODUCING BISMUTH TITANATE FINE POWDERS

[75] Inventors: Hiroshi Yamanoi; Satoru Uedaira; Masayuki Suzuki; Hidemasa Tamura, all of Kanagawa, Japan

[73] Assignee: Sony Corporation, Tokyo, Japan

[21] Appl. No.: 814,256

[22] Filed: Dec. 30, 1985

[30] Foreign Application Priority Data

Dec. 29, 1984 [JP] Japan .................... 59-278503
Apr. 25, 1985 [JP] Japan .................... 60-89578

[51] Int. Cl.$^4$ .................................... C01G 23/00
[52] U.S. Cl. ............................ 423/598; 75/70; 156/DIG. 79; 501/134
[58] Field of Search ............ 423/598; 501/134; 75/70; 156/DIG. 79

[56] References Cited

U.S. PATENT DOCUMENTS

| | | | |
|---|---|---|---|
| 3,609,482 | 9/1971 | Edelman et al. | 501/134 |
| 3,962,027 | 6/1976 | Bruton | 423/598 |
| 3,977,887 | 8/1976 | McIntosh | 501/134 |
| 4,054,531 | 10/1977 | Takahashi et al. | 501/134 |

Primary Examiner—Stephen J. Lechert, Jr.

[57] ABSTRACT

A method of producing bismuth titanate fine powders comprising hydrolysis product of an inorganic titanium compound or water soluble titanium salt, reacting the solution with water soluble bismuth compound in an aqueous alkaline solution having pH value between 14.0 and 14.9, and filtering and washing the resulting precipitates from the solution. Further, a method of producing bismuth titanate fine powder comprising the steps of, preparing an aqueous solution containing hydrolysis product of titanium compound or water soluble titanium salt, reacting the solution with water soluble bismuth compound in an aqueous alkaline solution having pH value between 14.1 and 14.85 at a temperature not lower than 150° C.

When the reaction is to be carried out at an ambient pressure, it can be carried at a temperature higher than 50° C. and lower than the boiling point of the solution at the ambient pressure. The precipitate resulting from the reaction is filtered and heat-treated to fine powders of bismuth titanate $Bi_4Ti_3O_{12}$. When the reaction of the solution is carried out in an autoclave and at higher than 150° C., it is possible to directly obtain the fine powders of bismuth titanate of the orthorhombic structure.

6 Claims, 16 Drawing Figures

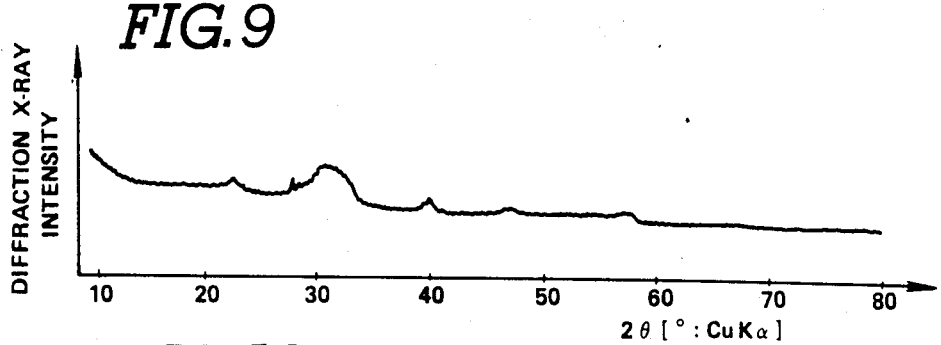
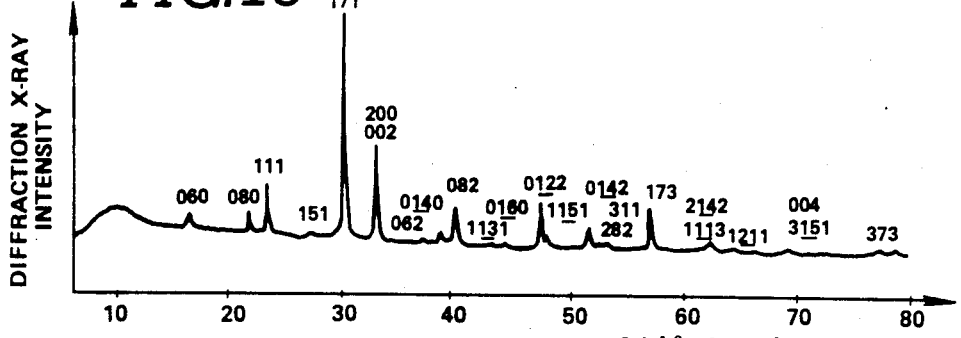
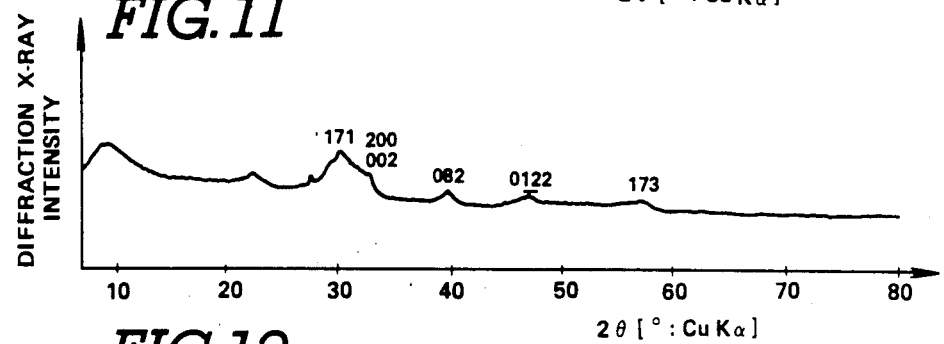
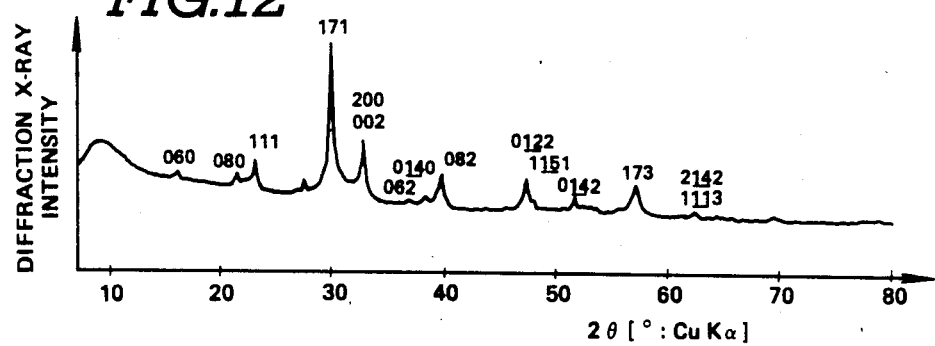

← 1μm

1μm

METHOD OF PRODUCING BISMUTH TITANATE FINE POWDERS

BACKGROUND OF THE INVENTION

1. Field of the Invention

This invention relates to a method of producing fine and uniform bismuth titanate powders or particles used for electronic components such as capacitors.

2. Description of the Prior Art

Recently, the methods of producing comminuted ferroelectric materials have been studied from many aspects. There comminuted ferroelectric materials are used e.g. for ceramic capacitors. In association with the demand for reduced size and increased packing density of electronic parts, it has been desired to reduce the size and weight while increasing the capacity and high frequency characteristics of the ceramic capacitors. To this end, it is necessary to reduce the size of the ferroelectric material in order to make the ceramic layer thin and uniform.

On the other hand, in order to improve calcination and temperature characteristics of the ceramic capacitors, it is necessary to elevate the heat treatment temperature. However on such occasion, the resulting capacitor may not be of uniform properties because of vaporization of the lead oxide PbO contained in the starting material. Therefore it becomes necessary to lower the calcination temperature to present vaporization of lead oxide PbO. Thus, fine powders of the ferroelectric materials are desired in order to make the properties of the ceramic capacitors more uniform.

When the ferroelectric materials are used as starting materials for preparing electrostrictive, piezoelectric on transparent ceramic material, other than the capacitor material, the ferroelectric materials of the small and uniform particle size are sequired in order to improve calcinerability or temperature characteristics.

These ferroelectric materials include bismuth titanate $Bi_4(TiO_4)_3$ endowed with various properties. The $Bi_4(TiO_4)_3$ particles are usually prepared by that bismuth carbonate $Bi_2(CO_3)O_2.0.5H_2O$ or $Bi_2O_3$ and titanium oxide $TiO_2$ are ball-milled and subjected to a solid phase reaction at an elevated temperature of 600° to 900° C. to be again ball-milled to fine particle size and passed through a sieve.

These bismuth titanate fine particles are however inconvenient because of rather poor particle size distribution of the ball milled material, and possible inclusion of coarse size particle or impurity metal oxide due to prolonged crushing.

SUMMARY OF THE INVENTION

It is an object of the present invention to provide an improved method of producing bismuth titanate fine powders.

It is another object of the present invention to provide a method of producing bismuth titanate fine powders having small and uniform powder size.

It is further object of the present invention to provide a method of producing bismuth titanate fine powders fase of impurity metal oxide.

It is still further object of the present invention to provide a method of producing bismuth titanate fine powders having a stoichiometric composition.

It is yet further object of the the present invention to provide a method of producing bismuth titanate fine powders superior in producing wet.

As a result of our researches for the method of wet synthesis of fine bismuth titanate particles with good particle size distribution, the present inventors found that $Bi_4(TiO_4)_3$ can be yielded as a sole phase and with fine and uniform particle size by using a specified range of the pH value.

The present invention is based on this finding and characterized in a method of producing bismuth titanate fine powders comprising hydrolysis product of an inorganic titanium compound or water soluble titanium salt, reacting said solution with water soluble bismuth compound in an aqueous alkaline solution having pH value between 14.0 and 14.9, and filtering and wahsing the resulting precipitates from said solution. Further, the present invention is characterized in a method of producing bismuth titanate fine powder comprising the steps of, preparing an aqueous solution containing hydrolysis product of titanium compound or water soluble titanium salt, reacting said solution with water soluble bismuth compound in an aqueous alkaline solution having pH value between 14.1 and 14.85 at a temperature not lower than 150° C.

When the reaction is to be carried out at an ambient pressure, it can be carried at a temperature higher than 50° C. and lower than the boiling point of the solution at the ambient pressure. The precipitate resulting from the reaction is filtered and heat-treated to fine powders of bismuth titanate $Bi_4Ti_3O_{12}$. When the reaction of the solution is carried out in an autoclave and at higher than 150° C., it is possible to directly obtain the fine powders of bismuth titanate of the orthorhombic structure.

The bismuth titanate fine powders obtained by the present process are minute and uniform in size, while showing a constant Bi to Ti ratio and being free of metal oxide inclusion.

In addition, because of the fine and uniform powders size, the bismuth titanate fine powders can be advantageously utilized for as variety of electronic materials, such as electrostrictive, piezoelectric or transparent ceramic materials.

BRIEF DESCRIPTION OF THE DRAWINGS

FIGS. 9 to 12 show X-ray diffraction spectra of the bismuth titanate fine powders or amorphous state fine powders.

DESCRIPTION OF THE PREFERRED EMBODIMENT

According to the present invention, in prepering fine powders of the bismuth titanate by the liquid phase reaction at the ambient pressure, the hydrolysis product of the titanium compound or the water soluble titanium salt is wet reacted with a water soluble bismuth salt in a strongly alkaline aqueous solution to produce the precipitate of the fine powders in the amorphous state, these precipitate being then washed with cold or lukewarm water so as to be freed of the alkali ions such as $K^+$, $Na^+$ or $Li^+$ to be then filtered, dried and subjected to heat treatment.

The pH value is critical in the above reaction so that $Bi_4(TiO_4)_3$ may be yielded as a single phase by the setting the pH value to be within 14 to 14.9.

Figure 1:
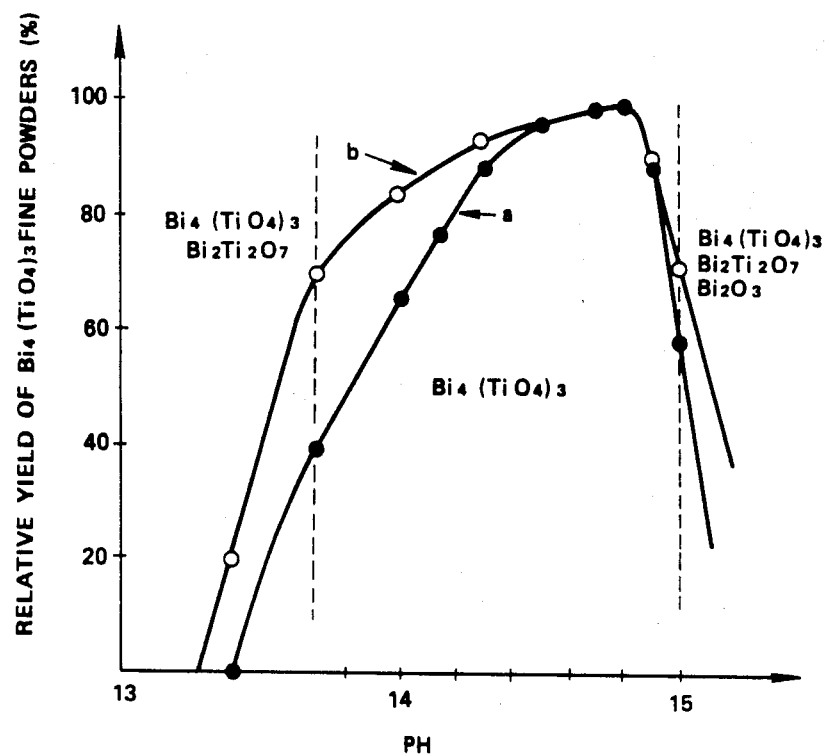
FIG. 1 is a diagram showing the pH dependency of the relative yield of the bismuth titanate fine powders.

Our experiments have revealed the $Bi_2Ti_2O_7$ and compounds exist together at pH lower than 13.7 while $Bi_2Ti_2O_7$ and $Bi_2O_3$ exist together at pH higher than 15.0. FIG. 1 is a chart showing the relative yield of $Bi_4(TiO_4)_3$ fine particles that are produced by the wet reaction at 100° C. for 4 hours at the Bi/Ti molar ratio of 4/3 under changing the pH value and firing or calcining the resulting reaction product at 620° C. for 20 to 100 hours. It is noted that the yield of the fine $Bi_4(TiO_4)_3$ particles has been calculated from the (171) peak area of the X-ray diffraction peak with the use of the copper target and the nickel filter. This method of calculation applies throughout the specification. The curve a in FIG. 1 represents the yield for the firing interval of 20 hours and the curve b that for the firing interval of 100 hours. It is seen from FIG. 1 that $Bi_4(TiO_4)_3$ may be yieded as a sole phase and at a higher yield.

Figure 2:
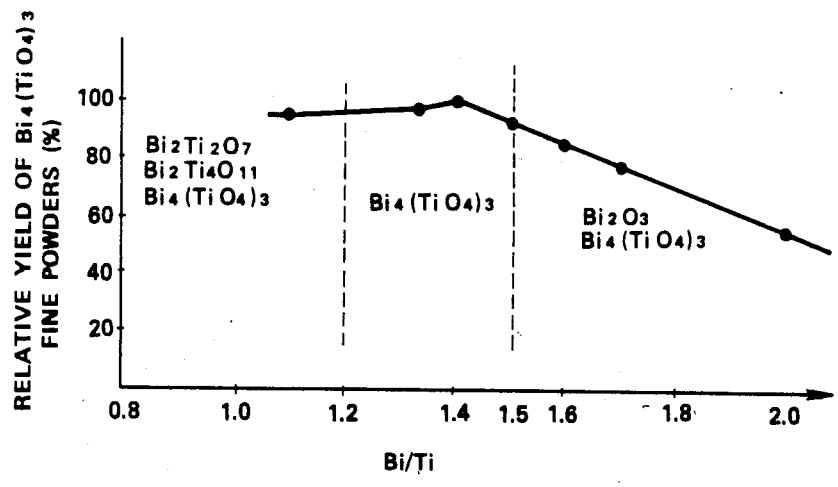
FIG. 2 is a diagram showing the Bi/Ti molar ratio dependency of the relative yield of the bismuth titanate fine powders.
Figure 3:
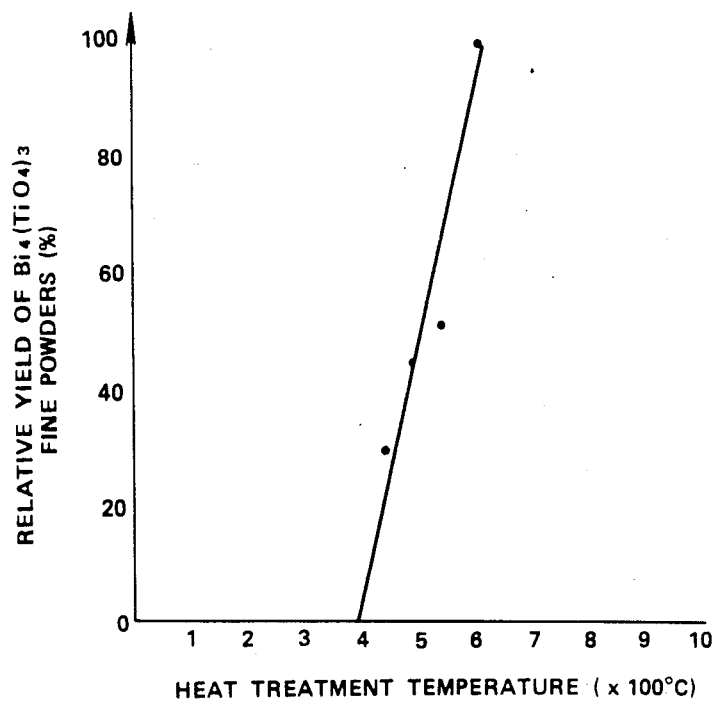
FIG. 3 is a diagram showing the heat-treating temperature dependency of the relative yield of the bismuth titanate fine powders.

The Bi to Ti molar ratio of the starting material is preferably in the range from 1.2 to 1.5. In order to investigate into the Bi/Ti molar ratio dependency, the relative yield of the fine $Bi_4(TiO_4)_3$ particles resulting from the wet reaction for 4 to 8 hours at 100° C. and varying mixture ratio of the starting materials and the subsequent calcination of the reaction product at 620° C. for 100 hours was measured. The result is shown in FIG. 2. From this figure it is seen that $Bi_2Ti_2O_7$ and $Bi_2Ti_4O_7$ exist together for Bi/Ti<1.1, whereas $Bi_2O_3$ exist with other compounds for Bi/Ti>1.6 and the yield is lowered. On the other hand, $Bi_4(TiO_4)_3$ may be obtained for Bi/Ti=1.2 to 1.5 as a sole phase with high yield, and the yield becomes maximum at Bi/Ti=1.4 or thereabouts. The result is shown in FIG. 3. From this figure it is seen that the yield is increased with rise in the heat treatment temperature. It has been confirmed that crystallization may occur at higher than 420° C. and hence the more preferred temperature is higher than 460° C. and especially higher than 500° C.

Figure 4:
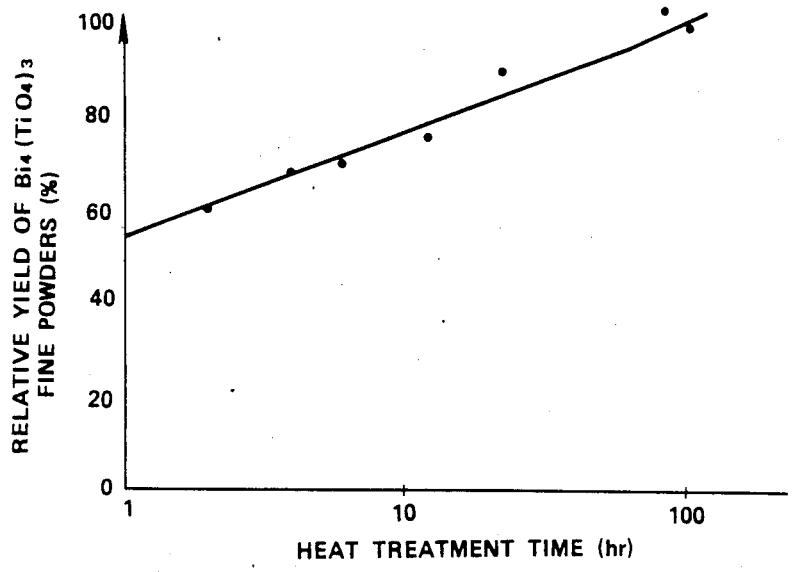
FIG. 4 is a diagram showing the heat-treating time interval dependency of the bismuth titanate fine powders.

The yield of fine particles of bismuth titanate $Bi_4(TiO_4)_3$ resulting from the aforementioned heat treatment at the heat treatment temperature of 620° C. and varying treatment time interval was also measured. The result is shown in FIG. 4. It may be seen from this figure that the yield is increased with the increase in the reaction time interval.

The present invention resides in the method of producing fine particles of bismuth titanate comprising the steps of wet reacting a hydrolysis product of a titanium compound or a water soluble titanate with a water-soluble bismuth compound at the pH value in the range of 14 to 14.9 and heat treating the resulting product. In distinction from the method of mechanical communition, the present method makes it possible to prevent inclusion of metal oxides. The composition ratio of the resulting fine particles of bismuth titanate can be maintained accurately. In addition, when these particles are used in, for example, a ceramic capacitor, the calcination temperature may be lowered.

The fine bismuth titanate particles may be directly obtained from the liquid phase with the use of an autoclave by reacting a hydrolysis product of a titanium compound or a water soluble titanium salt and the water soluble bismuth compound in an aqueous solution at a pH value in the range of 14.1 to 14.85 and a temperature higher than 150° C.

In accordance with the present invention, fine bismuth titanate particles can be obtained by the high temperature wet reaction of the hydrolysis product of the titanium compound or the water soluble titanium salt with the water soluble bismuth compound in a strongly alkaline aqueous solution with the use of an autoclave, washing of the resulting precipitate of the fine particles in cold or lukewarm water to remove alkaline ions such as $K^+$, $Na^+$ or $Li^+$, filtration and drying of the resulting residual product.

It is noted that the pH value of the aqueous solution and the temperature at the time of the wet reaction are critical since the fine particles of bismuth titanate $Bi_4(TiO_4)_3$ can be obtained as a single phase product by using the pH value in the range of 14.1 to 14.85 and temperature higher than 150° C. When using an autoclave, mechanical limitation may be advantageously removed by using the heat treatment temperature lower than 500° C.

Figure 5:
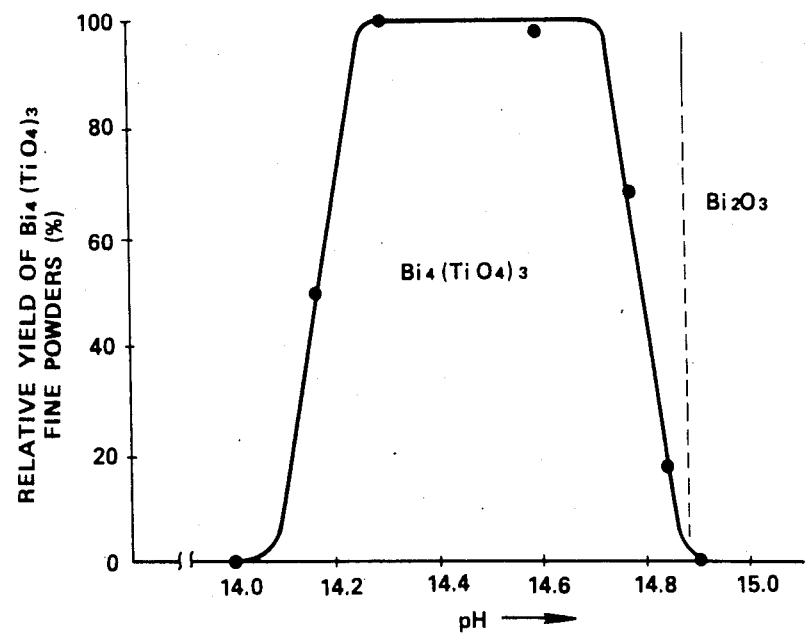
FIG. 5 is a diagram showing the pH dependency of the solution yield of the bismuth titanate fine powders.

Our experiments have also revealed that, in the above described wet reaction, BiOCl is produced at pH lower than 12.0, while $Bi_2O_3$ is produced at pH higher than 14.9. FIG. 5 shows the relative yield of the fine particles of bismuth titanate obtained upon wet reaction in an autoclave at 220° C. for 4 hours with the Bi/Ti molar ratio of 4/3 and various pH values of the aqueous solution, filtration and drying. The relative yield value has been obtained from the (171) peak area of the X-ray diffraction by using the copper target and the nickel filter. This method of calculation holds throughout the present description. It has been confirmed from FIG. 5 that the fine bismuth titanate particles can be synthesized as a single phase and at higher yield when the pH value is in the range from 14.1 to 14.85.

Figure 6:
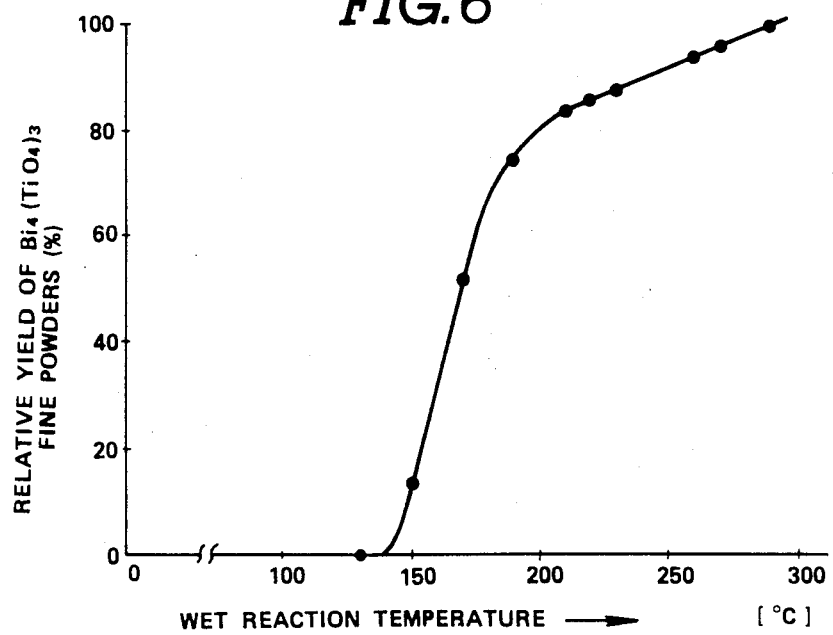
FIG. 6 is a diagram showing the temperature dependency of the relative yield of the bismuth titanate fine powders.

In the above wet reaction, the reaction temperature may be higher than 150° C. The measured results of the relative yield of the fine bismuth titanate powders obtained by wet reaction for 3 hours in an autoclave at pH of 14.47 and Bi/Ti equal to 4/3 under varying the reaction temperature, followed by the filtration and drying, are shown in FIG. 6. It can be confirmed from this figure that the yield of the fine particles of bismuth titanate is increased with rise in the reaction temperature, and that the reaction temperature may be higher than 150° C. and preferably higher than 170° C.

Figure 7:
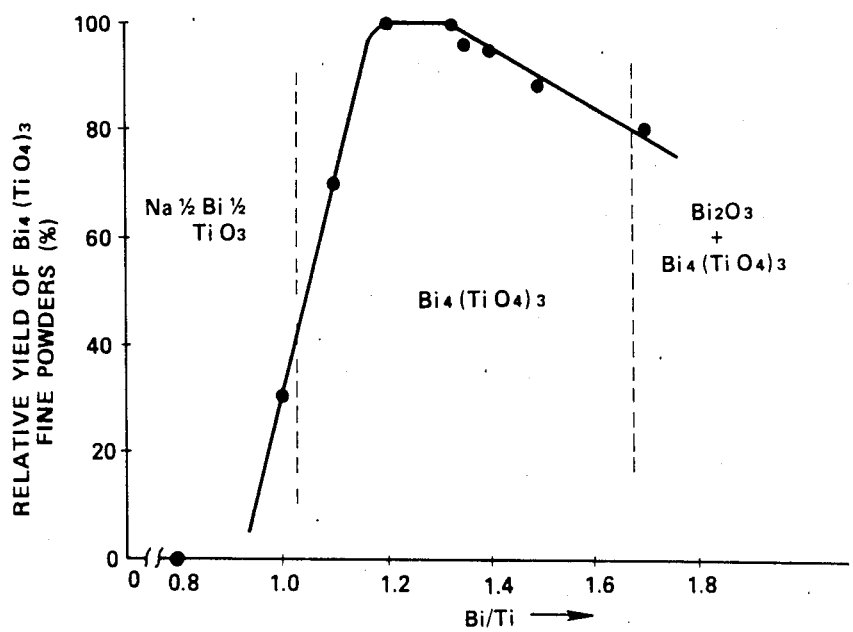
FIG. 7 is a diagram showing the Bi/Ti molar ratio dependency of the bismuth titanate fine powders.

Preferably, the molar ratio Bi/Ti of bismuth (Bi) and titanium (Ti) included in the starting material in the range of 1.1 to 1.6. FIG. 7 shows the measured results of the relative yield of the bismuth titanate fine particles obtained by wet reaction in the autoclave at 220° C. for 8 hours with pH of the aqueous solution equal to 14.47 and various values of the Bi/Ti molar ratio of the starting material, filtration, and drying. It is seen from this figure that $Na_{1/2}Bi_{1/2}TiO_3$ exists together for Bi/Ti lower than 1.0, while $Bi_2O_3$ exists together for Bi/Ti higher than 1.7, with the yield of the fine particles of bismuth titanate being lowered in both of these cases. In contrast thereto, for Bi/Ti in the range of 1.1 to 1.6, fine particles of bismuth titanate $Bi_4(TiO_4)_3$ can be produced as a sole phase at higher yield, with the yield being maximum in the vicinity of Bi/Ti of 1.3.

Figure 8:
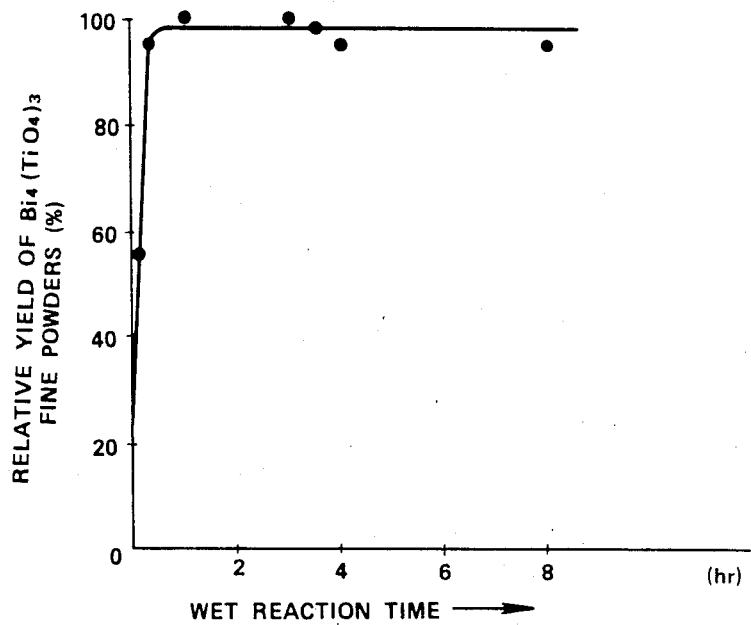
FIG. 8 is a diagram showing the wet reaction time interval dependency of the relative yield of the bismuth titanate fine powders.

The relative yield of the bismuth titanate fine particles obtained by the wet reaction in the autoclave at 220° C., Bi/Ti=4/3, the pH value of the aqueous solution of 14.47 and various the reaction time interval, followed by filtration and drying, was also measured. The results are shown in FIG. 8. It is apparent from this figure that the relative yield is increased with lapse of time and becomes approximately constant at 90% when the reaction is continued for longer than about 20 minutes.

The hydrolysis product of the titanium compound or the water-soluble titanium salt can be wet reacted in an aqueous solution at the pH value in the range of 14.1 to 14.85 and temperature higher than 150° C. to yield the fine bismuth titanate particles without heat treatment, these particles being free of impurities and also being fine and uniform in size. Hence, when the fine bismuth titanate particles are directly prepared in this manner from the liquid phase, higher temperature heat treatment is dispensed with to eliminate the risk of growth of crystal grains due to firing so that it becomes possible to obtain the fine particles of bismuth titanate of more uniform particle size.

The description having reference to several specific Examples of the present invention is given hereinbelow. It should be noted that these Examples are given only by way of illustration and not intended to limit the scope of the invention.

EXAMPLE 1 50 g of titanium chloride $TiCl_4$ added dropwise into 100 ml of ice water for 2 to 3 minutes to an aqueous solution of titanium chloride. In the aqueous solution was added about 200 ml of a sodium hydroxide (NaOH) solution (concentration: 140 g/l). To the resulting suspension was added sodium hydroxide (NaOH) for adjusting the pH value to 7. To the resulting product was further added water to give a total volume equal to 100 ml.

To a 50 ml sample of the liquid suspension was added 16.15 g of bismuth nitrate $Bi(NO_3)_3 \cdot 5H_2O$. To the resulting solution was added 16 g of sodium hydroxide (NaOH) and water in this order to give a total volume of 100 ml and a value pH of 14.6. The solution was reacted at 100° C. for 8 hours under stirring by use of a magnet stirrer. The white colored precipitates formed after the reaction were subjected to decantation a number of times for removing impurities, such as alkali ions followed by filtration, washing with water and drying overnight at 90° C.

The product obtained by the above process was analyzed by the X-ray diffractive method. The results are shown in FIG. 5. It is seen from this figure that the product consists in a mixture of bismuth Bi and titanium Ti in an amorphous state.

Figure 13:
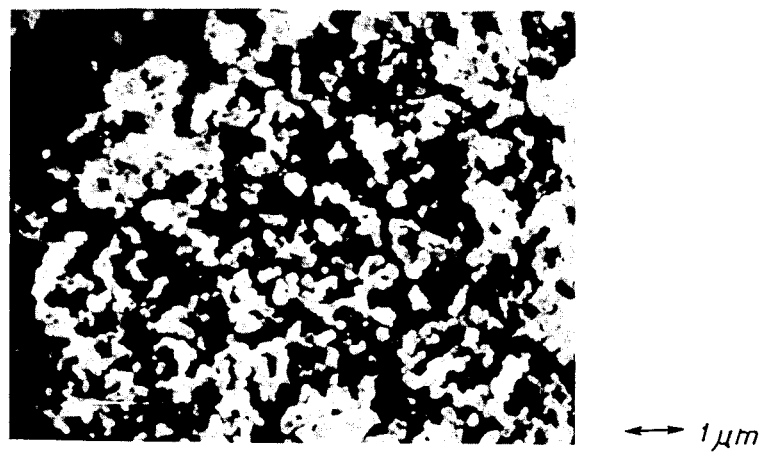
FIG. 13 is a SEM photo of the bismuth titanate fine powders.

The fine powders obtained by heat treatment for 20 hours of the fine powders in the amorphous state were analyzed by the X-ray diffractive method. The results are shown in FIG. 10. These particles were identified to be bismuth titanate $Bi_4(TiO_4)_3$ of the orthorhombic structure because of coincidence of the diffraction pattern shown in FIG. 10 with the ASTM card 12-13. FIG. 13 shows a photo taken by a scanning electron microscope (SEM) of these fine powders of bismuth titanate $Bi_4(TiO_4)_3$.

FIGS. 11 and 12 show the X-ray diffraction spectrum of the precipitates of the fine particles in the amorphous state after these precipitates were heat-treated at 450° and 500° C. for 20 hours. It is seen from this diffraction spectrum that the particles are in the amorphous state at the heat-treatment temperature at 450° C. (FIG. 11) and that the diffraction pattern of bismuth titanate $Bi_4(TiO_4)_3$ was clearly demonstrated at the heat-treatment temperature of 500° C. (FIG. 12).

The lattice constant was calculated from the X-ray diffraction data obtained from the sample which was previously heat-treated at 620° C. for 100 hours. It was confirmed that the fine powders of bismuth titanate $Bi_4(TiO_4)_3$ were the crystals of the orthorhombic structure with $a_0=5.431$ Å, $b_0=32.74$ Å and $c_0=5.416$ Å.

EXAMPLE 2

50 g of titanium chloride $TiCl_4$ was added to 100 ml of ice water dropwise for 2 to 3 minutes to give an aqueous solution of titanium chloride. To this aqueous solution was added about 200 ml of a solution of sodium hydroxide NaOH (140 g/l) to a white colored suspension to which sodium hydroxide NaOH was added to adjust the pH to 7. To the resulting product was further added water to give a total volume of 500 ml. To a 50 ml sample of the suspension was added 24.03 g of bismuth sulfate $Bi_2(SO_4)_3$. 8 g of sodium hydroxide NaOH was added to this solution and water was further added to the resulting mixture to give a total volume of 100 ml. The pH value at this time was 14.3. The solution was reacted at 100° C. for 8 hours under agitation by a magnetic stirrer. The white colored precipitates formed after the reaction was subjected to decantation a number of times for removing impurities, such as alkali ions. The resulting product was filtered, washed with water and dried overnight. at 100° C.

The resulting product was analyzed by the X-ray diffractive method. The diffraction pattern of the resulting product could be wholly identified with that of the amorphous state mixture of the bismuth Bi and titanium Ti shown in FIG. 9.

The X-ray diffraction pattern of the amorphous state fine particles heat-treated for 20 hours at 1000° C. was could be wholly identified with that shown in FIG. 10. From the SEM photo it was shown that these particles were the crystals same in size and shape as the crystals shown in FIG. 13. It was thus seen that these fine particles are bismuth titanate fine particles of the orthorhombic crystal structure.

EXAMPLE 3

50 g of titanium chloride was added dropwise to 100 ml of ice water for 2 to 3 minutes to give an aqueous solution of titanium chloride. To this aqueous solution was added concentrated ammoniac water to give a white colored suspension to which ammoniac water was further added for adjusting the pH value to 8. To the resulting mixture was added water to a total volume of 500 ml. A 50-ml sample was taken of this suspension and added with 11.09 g of bismuth chloride $BiCl_4$. To this solution were added a solution of sodium hydroxide NaOH and water to give a total volume of 100 ml. The pH value at this time was 14.3. The solution was reacted at 100° C. for 6 hours under agitation by the use of a magnetic stirrer. The white colored precipitates formed after the reaction were freed of impurities such as alkali ions by repeated decantation and resulting product was filtered, washed with water and dried overnight at 90° C.

Figure 14:
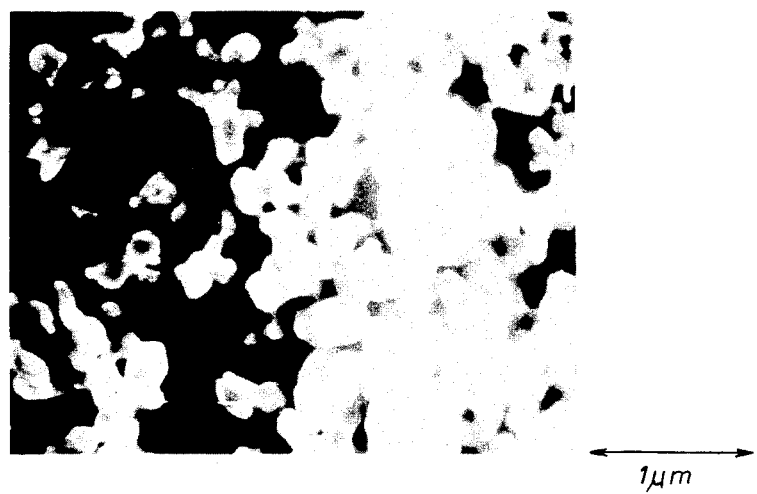
FIG. 14 is a SEM photo of the bismuth titanate fine powders in the amorphous state.

The results of the X-ray diffraction analysis of the resulting product were the same as those shown by the X-ray diffraction spectrum shown in FIG. 9. FIG. 14 shows the SEM photo of the material.

The amorphous state fine particles were heat-treated at 620° C. for 6 hours. The X-ray diffraction pattern of the test material was wholly identified with that shown in FIG. 10. From the SEM photo, it was shown that the crystals present are of the same size and shape as those shown in FIG. 13.

EXAMPLE 4

50 g of titanium chloride was added dropwise to 100 ml of ice water for 2 to 3 minutes to an aqueous solution of titanium chloride. About 200 ml of a sodium hydroxide (NaOH) solution (concentration: 140 g per liter) was added to the resulting aqueous solution to a white-colored liquid suspension to which sodium hydroxide (NaOH) was added for adjusting the pH value to 7. To the resulting product was added water to give a total volume of 500 ml. A 50-ml sample was taken of the suspension and added with 32 g of soduium hydroxide NaOH. To the rsulting product was further added water to give a total volume of 100 ml (pH, 14.9). The solution was reacted at 100° C. for 8 hours under agitation by means of a magnetic stirrer. The white colored preciptitates formed by the reaction were freed of impurities such as alkali ions by repeated decantation and the resulting product was filtered, washed with water and dried overnight at 100° C.

Tests were conducted in accordance with the above described method with changes in the amount of bismuth chloride. The results are shown in the following Table 1.

TABLE 1

| Nos. | Bi/Ti mol. ratio | Amount of $BiCl_3$ (g) to 5 g of TiCl | Results of X-ray diffraction after wet reaction | Results of X-ray diffraction after heat treatment at 620° C. for 20 hours |
|---|---|---|---|---|
| 1 | 1.28 | 10.638 | amorphous fine particles | $Bi_4(TiO_4)_3$ fine particles |
| 2 | 1.30 | 10.804 | amorphous fine particles | $Bi_4(TiO_4)_3$ fine particles |
| 3 | 1.32 | 10.971 | amorphous fine particles | $Bi_4(TiO_4)_3$ fine particles |
| 4 | 1.33 | 11.054 | amorphous fine particles | $Bi_4(TiO_4)_3$ fine particles |
| 5 | 1.35 | 11.220 | amorphous fine particles | $Bi_4(TiO_4)_3$ fine particles |

The materials obtained by the above process were identified to be an amorphous state fine particles consisting of a mixture of bismuth Bi and titanium Ti since they showed an X-ray diffraction pattern same as that shown in FIG. 9, while the crystals shown in the SEM photo were of the size and shape similar to that shown in FIG. 14.

These amorphous state fine particles were subjected to heat treatment at 620° C. for 20 hours. The particles obtained by the above described process could be identified to be bismuth titanate $Bi(TiO_4)_3$ of the orthorhombic structure since they showed the X-ray diffraction pattern extremely similar to that of the pattern shown in FIG. 10, while the crystals seen in the SEM photo were also similar in shape and size to those shown in FIG. 13.

EXAMPLE 5

50 g of titanium chloride was added dropwise to 100 ml of ice water for 2 to 3 minutes to an aqueous solution of titanium chloride. The pH value of the aqueous solution was adjusted to 7.0 by addition of the NaOH solution. The resulting solution was added with water to give a total volume equal to 500 ml.

A 50-ml sample was taken of the resulting solution and added with 17.0 g of bismuth sulfate $Bi(NO_3)$. $5H_2O$ and sodium hydroxide NaOH in this order to a pH value of 7.0. To the resulting solution were further added 12 g of NaOH and water to a total volume equal to 100 ml. The pH value of the resulting aqueous solution was 14.5.

The aqueous solution was reacted under agitation at 250° C. for 3 hours in a hermetically sealed autoclave type reaction vessel. The white colored precipitated formed by the reaction were freed of impurities such as alkali ions by repeated decantation and the resulting product was filtered, washed with water and dried overnight at 100° C.

The fine particles obtained in this manner were analyzed by the X-ray diffractive method. These particles were identified to be bismuth titanate particles of the orthorhombic structure because of the coincidence of the diffraction pattern of FIG. 15 with the ASTM card 12-123. FIG. 16 shows the SEM photo of these bismuth titanate particles.

The lattice constant was calculated from the X-ray diffraction data of the fine particles of the bismuth titanate. These bismuth titanate particles could be identified to be the crystals orthorhombic structure with $a_0 = 5.438$ Å, $b_0 = 32.70$ Å and $c_0 = 5.415$ Å.

EXAMPLE 6 100 ml of water was added dropwise to 50 g of titanium hydrochloride to an aqueous solution of titanium chloride. To this aqueous solution was added 40 g of NaOH to a white colored liquid suspension to which 24.81 g of bismuth sulfate $Bi_2(SO_4)_3$ and NaOH were added in this order to a pH value of 7. To the resulting mixture was added water to give a total volume equal to 500 ml.

A 50-ml sample was taken of the solution and added with 8 g of NaOH and water in this order to give a total volume equal to 100 ml. The pH value of the aqueous solution was 14.3.

The aqueous solution was reacted under agitation at 220° C. for 1 hour in a hermetically sealed autoclave type reaction vessel. The white colored precipitates formed by the reaction were freed of impurities such as alkali ions by repeated decantation and the resulting product was filtered, washed with water and dried overnight at 80° C.

Figure 15:
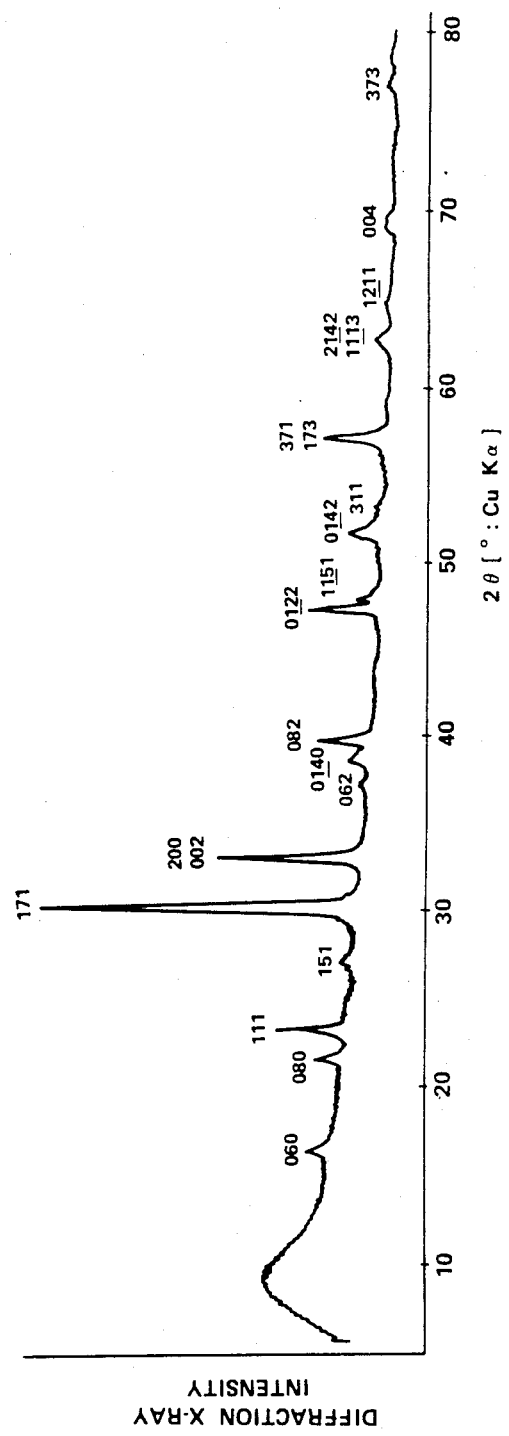
FIG. 15 shows an X-ray diffraction spectra of the bismuth titanate fine powders obtained by the present method.
Figure 16:
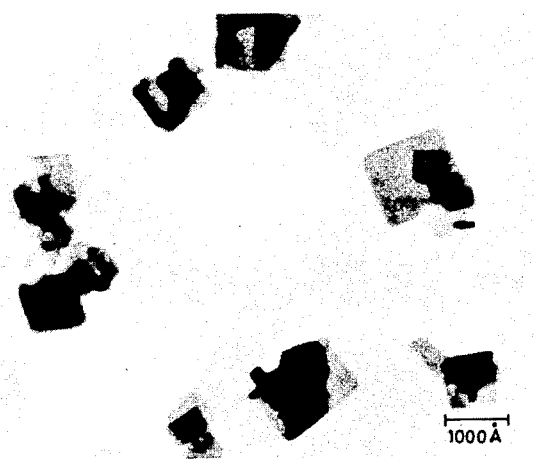
FIG. 16 is a SEM photo of the bismuth titanate fine powders.

The X-ray diffraction analysis of the fine particles showed the diffraction pattern wholly identified with that of the bismuth titanate $Bi_4(TO_4)_3$ shown in FIG. 15. From the SEM photo, it was demonstrated that the crystals present were similar in size and shape to those shown in FIG. 16. In this manner, these particles could be identified to be bismuth titanate $Bi_4(TO_4)_3$ of the orthorhombic crystal structure.

EXAMPLE 7

50 g of titanium chloride was added dropwise to 200 ml of ice water for 3 to 5 minutes to an aqueous solution of titanium chloride. To this aqueous solution was added concentrated ammoniac water $NH_4OH$ to a white colored liquid suspension to which was added ammoniac water $NH_4OH$ to a pH of 8. To the resulting product was added water to give a total volume equal to 500 ml.

A 50-ml sample was taken of this solution and added with 11.08 g of bismuth chloride. To the resulting product were added NaOH in solution and water to give a total volume equal to 100 ml. The pH value of the aqueous solution was 14.7.

The aqueous solution was reacted under agitation at 290° C. for 3 hours in a hermetically sealed autoclave type reaction vessel. The white-colored precipitated formed by the reaction were freed of impurities such as alkali ions by repeats decantation. Thus the treated product was filtered, washed with water and dried overnight at 90° C.

The X-ray diffraction analysis of the fine particles showed the diffraction pattern completely identified with that of bismuth titanate $Bi_4(TiO_4)_3$ shown in FIG. 15. Also, from the SEM photo, it was demonstrated that the crystals present were similar in size and shape to those shown in FIG. 16. In this manner, these particles could be identified to be bismuth titanate $Bi_4(TiO_4)_3$ of the orthorhombic crystal structure.

100 ml of water was added dropwise to 50 g of titanium chloride $TiCl_4$ to an aqueous solution of titanium chloride. About 200 ml of the NaOH solution (concentration 140 g/l) was added to the resulting aqueous solution to a white colored liquid suspension to which 110.8 g of bismuth chloride $BiCl_3$ and a preset amount of NaOH were for adjusting the pH value to 7.0. To the resulting product was added water to give a total volume of 500 ml.

To this solution were added 120 g of NaOH and a suitable amount of water to give a total volume of 1000 ml.

A 100-ml sample was taken of the aqueous solution and reacted in an autoclave-type hermetically sealed vessel for one hour under constant agitation. The white-colored precipitates formed by the reaction were freed of impurities, such as alkali ions, by repeated decantation, and the resulting product was filtered, washed with water and dried overnight at 100° C.

In the above operation, bismuth titanate fine particles were prepared at various reaction temperatures and analyzed by the X-ray diffractive method. The results are shown in Table 2.

TABLE 2

| Nos. | Reaction temperature (°C.) | Results of X-ray diffraction |
|---|---|---|
| 1 | 190 | $Bi_4(TiO_4)_3$ fine particles |
| 2 | 230 | $Bi_4(TiO_4)_3$ fine particles |
| 3 | 270 | $Bi_4(TiO_4)_3$ fine particles |
| 4 | 290 | $Bi_4(TiO_4)_3$ fine particles |

It is seen from the above Table that the diffraction pattern of the fine particles obtained by the above described process may be wholly identified with that of the bismuth titanate fine powders shown in FIG. 15. Also it is seen from the SEM photo that the particles are the crystals similar in size and shape to those shown in FIG. 16. Therefore, these particles could be identified to be bismuth titanate $Bi_4(TiO_4)_3$ of the orthorhombic structure.

What is claimed is:

1. A method for producing bismuth titanate fine powder comprising the steps of preparing an aqueous solution containing hydrolysis product of an inorganic titanium compound or water soluble titanium salt, reacting said solution with water soluble bismuth compound in an aqueous alkaline solution having pH value between 14.0 and 14.9, and filtering and washing the resulting precipitates from said solution.

2. A method according to claim 1, wherein said reaction is carried out at a temperature between 50° C. and boiling point of said solution.

3. A method according to claim 2, further comprises the steps of firing said resulting precipitate at a temperature higher than 420° C.

4. A method according claim 2, ratio of bismuth to titanate in said solution is between 1.2 and 1.5.

5. A method for producing bismuth titanate fine powder comprising the steps of, preparing an aqueous solution containing hydrolysis product of titanium compound or water soluble titanium salt, reacting said solution with water soluble bismuth compound in an aqueous alkaline solution having pH value between 14.1 and 14.85 at a temperature not lower than 150° C.

6. A method according to claim 5, wherein ratio of bismuth to titanium in said aqueous alkaline solution is between 1.1 and 1.6.

* * * * *